(12) United States Patent
Kim et al.

(10) Patent No.: US 7,801,855 B2
(45) Date of Patent: Sep. 21, 2010

(54) METHOD AND APPARATUS FOR MERGING LOG ENTRIES IN A DATABASE MANAGEMENT SYSTEM

(75) Inventors: Young-seok Kim, Yongin-si (KR); Kyung-sub Min, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 400 days.

(21) Appl. No.: 11/751,077

(22) Filed: May 21, 2007

(65) Prior Publication Data

US 2008/0120349 A1    May 22, 2008

(30) Foreign Application Priority Data

Nov. 16, 2006 (KR) .................. 10-2006-0113386

(51) Int. Cl.
*G06F 7/00* (2006.01)
(52) U.S. Cl. ................ 707/625; 707/686; 707/695
(58) Field of Classification Search .............. None
See application file for complete search history.

(56) References Cited

U.S. PATENT DOCUMENTS 5,317,739 A * 5/1994 Elko et al. .............. 709/216
5,487,166 A * 1/1996 Cossock .................. 707/7

FOREIGN PATENT DOCUMENTS

JP    2001-229063 A    8/2001

OTHER PUBLICATIONS

Shen et al., "A Log Compression Algorithm for Operation-based Version Control System," Proceedings of the 26th Annual International Computer Software and Applications Conference, 2002.*

* cited by examiner

*Primary Examiner*—Tim T. Vo
*Assistant Examiner*—Aaron Sanders
(74) *Attorney, Agent, or Firm*—Sughrue Mion, PLLC

(57) ABSTRACT

A logging method of reducing a log size by using a log entry when a log record is generated by an update, and an apparatus therefore, is provided. The method includes storing log information of a data page being updated; when the update of the data page is completed, reading the stored log information; generating a log record by using the read log information; and writing the generated log record in a log page. According to the method, the log size due to logging is reduced and the times of disk input and/or output operations decrease, thereby improving the updating speed of a database system.

15 Claims, 14 Drawing Sheets

| PREVIOUS LSN | TRANSACTION ID | TYPE | PAGE ID | LENGTH | OFFSET | BEFORE IMAGE | AFTER IMAGE |
|---|---|---|---|---|---|---|---|

FIG. 3B (RELATED ART)

| | | | | | | | | |
|---|---|---|---|---|---|---|---|---|
| LR1 | null | T10 | update | p1 | 4 | 10 | name | kate | —340 |
| LR2 | | T10 | update | p1 | 4 | 31 | 0000 | 0021 | —350 |
| | | T10 | update | p1 | 4 | 10 | kate | john | —360 |
| | | T10 | update | p1 | 4 | 27 | 0000 | 0701 | —370 |
| | | T10 | update | p1 | ... | ... | ... | ... | —380 |

FIG. 4A

| PAGE 1 | 4 BYTES | OFFSET:20 | 0 | 1 |
|---|---|---|---|---|
| PAGE 1 | 4 BYTES | OFFSET:20 | 1 | 2 |
| PAGE 1 | 4 BYTES | OFFSET:20 | 2 | 3 |

410
420
430

| PAGE 1 | 4 BYTES | OFFSET:20 | 0 | 3 |
|---|---|---|---|---|

| PAGE 1 | 4 BYTES | OFFSET:20 | 0 | 1 |
|---|---|---|---|---|
| PAGE 1 | 4 BYTES | OFFSET:24 | 0 | 1 |
| PAGE 1 | 4 BYTES | OFFSET:28 | 0 | 1 |

450
460
470

| PAGE 1 | 12 BYTES | OFFSET:20 | 000 | 111 |
|---|---|---|---|---|

```
PutLog :

if (IN CASE OF FIRST LOG ENTRY IN THE PAGE)
{
    GENERATE COPIED PAGE
}
GENERATE LOG ENTRY AND ADD IT TO LIST THROUGH OFFSET-BASED
SORTING
IDENTIFY NEIGHBORING AREA, IDENTICAL AREA, AND OVERLAPPING AREA
AND MERGE LOG ENTRIES
UPDATE ORIGINAL PAGE WITH AFTER-IMAGE
```

FIG. 14

```
Commit:

while (PAGE HAVING LOG ENTRY UPDATED BY COMMITTED TXN EXISTS)
{
    READ NEXT PAGE UPDATED BY COMMITTED TXN
    while (LOG ENTRY OF THE TXN EXISTS)
    {
        READ LOG ENTRY OF THE TXN
        GENERATE LOG RECORD
        if (LOG ENTRY OF OTHER TXN EXISTS IN THE PAGE)
        {
          //IF AREA UPDATED BY COMMITTED TXN IS ABORTED BY OTHER
          //TXN DURING UPDATE, MAINTAIN UPDATE IMAGE OF COMMITTED TXN
          RECORD AFTER-IMAGE OF THE READ ENTRY IN A
          COPIED PAGE
        }
        RECORD IN LOG PAGE
        DELETE READ LOG ENTRY
    }
    if (NO LOG ENTRY OF OTHER TXN EXISTS IN PAGE)
    {
        DELETE COPIED PAGE
    }
}
```

FIG. 15

```
Abort:

while (PAGE HAVING LOG ENTRY UPDATED BY ABORTED TXN EXISTS)
{
    READ NEXT PAGE UPDATED BY ABORTED TXN
    if (LOG ENTRY OF OTHER TXN EXISTS IN PAGE)
    {
        while (LOG ENTRY OF ABORTED TXN EXISTS)
        {
            READ LOG ENTRY OF THE ABORTED TXN
            RESTORE BEFORE-IMAGE FROM COPIED PAGE TO
            ORIGINAL COPY BY REFERRING TO LOG ENTRY
            DELETE READ LOG ENTRY
        }
    }
    ELSE
    {
        REPLACE ORIGINAL PAGE BY COPIED PAGE AND DISCARD ORIGINAL PAGE.
    }
}
```

FIG. 16

```
FlushPage(VictimizePage):

MAKE LOG RECORD OF ALL LOG ENTRIES AND WRITE IN LOG PAGE.
DELETE COPIED PAGE
```

FIG. 19
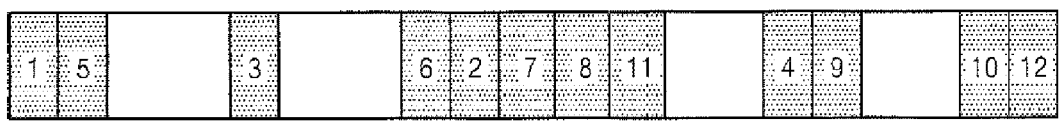
FIG. 20
FIG. 21
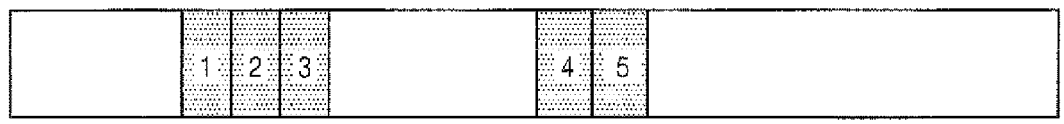
FIG. 22
| MODULE | TOTAL LOG RECORDS | INDIVIDUAL LOG RECORDS | LOG RECORDS AFTER MERGING |
|---|---|---|---|
| TOTAL | 37,418 | 5,555 | 653 |
| FPMap | 220 | 30 | 2 |
| CatalogMgr | 10,000 | 2 | 2 |
| DataPage (Btree, HeapFile) | 27,198 | 5,513 | 649 |
| Log Size | 1,315 KB | 195 KB | 23 KB |

METHOD AND APPARATUS FOR MERGING LOG ENTRIES IN A DATABASE MANAGEMENT SYSTEM

CROSS-REFERENCE TO RELATED PATENT APPLICATIONS

This application claims the benefit of Korean Patent Application No. 10-2006-0113386, filed on Nov. 16, 2006, in the Korean Intellectual Property Office, the disclosure of which is incorporated herein in its entirety by reference.

BACKGROUND OF THE INVENTION

1. Field of the Invention

The present invention relates to a method of logging in a database management system (DBMS), and more particularly, to a method and apparatus for logging by which when a DB is updated and log records are generated, the log size can be reduced by using log entries.

2. Description of the Related Art

The purpose of using a database management system (DBMS) is to systematically manage data, thereby more easily developing application programs, and to safely maintain and manage data under any circumstances. In general, the DBMS performs logging in relation to data changes in order to guarantee this stability (durability) of a database (DB).

Logging is a basic function of a DBMS, in which inserting, deleting or updating of data occurs, and is recorded in a stable storage device, such as a disk drive, in order to allow restoration of a previous DB state by using the logged information in an exceptional situation.

In the DBMS, the concept of durability is one of the important characteristics of transaction processing, which include atomicity, consistency, isolation, and durability (ACID). Durability means that if a transaction is successfully completed, it should be guaranteed that the result of processing the transaction is reflected in a DB, even if a system error occurs. Generally, the DBMS records the contents of state changes occurring in the DB when transactions are processed as a log, and stores this log in a stable storage medium such as a disk. Accordingly, the state changes of the DB are recorded in the log, and the log supports consistent maintenance of the states of the DB. In its simplest form, all contents changed by transactions are recorded in log files on a disk; however, when each operation of the transactions is accompanied by disk input and output operations, the performance of the DBMS is greatly reduced.

FIG. 1 is a schematic diagram illustrating a logging process of a DBMS according to conventional technology.

A DB 121 includes both a data file 121A and a log file 121B in predetermined areas of a disk drive 120 that is a permanent storage medium. As an update is performed by a transaction due to the execution of an application program, a related data file is loaded in units of pages into a buffer 113 of a memory 110. If an update of an area 111A corresponding to the transaction of a data page is performed on the memory 110, a log record 112B corresponding to the update is written in a log page 112. The updated data page and the generated log page are stored in the data file 121A and the log file 121B, respectively, of the disk drive 120, in accordance with a write ahead log (WAL) protocol.

The WAL protocol is a procedure for first storing a log page in a disk, and then storing a data page in order to remove errors that occur when changed contents of a transaction that is not completed is stored in the disk. According to the WAL protocol, when a system is re-executed, it can be safely restored to a state before an exception occurred.

FIG. 2 is a diagram illustrating a data structure of a log record format according to conventional technology.

The log record, including update information, is formed with a plurality of fields as illustrated in FIG. 2.

A previous log sequence number (LSN) is the LSN of a previous log record generated by a predetermined transaction. In other words, the LSN is the identification number (ID) of a log record and indicates a location in which the log record is recorded in a log page. Accordingly, the LSN comprises the number of a log page and an offset into the log page.

Besides the LSN, the log record includes a transaction ID, a type field indicating the type of the log record, a page ID indicating the number of an updated data page, the length of updated data, an offset into the updated data page, and a before-image and an after-image, corresponding to images from before and after an update, respectively.

FIGS. 3A and 3B illustrate log records generated when updates are performed according to conventional technology.

Referring to FIG. 3A, it can be determined that two update operations have occurred in a data page 1 310. First, data "name" 311 positioned at offset 10 of the data page 1 310 is changed to "kate" 311A, and data "0000" 312 positioned at offset 31 is changed to "0021" 312A.

Here, from a log record 1 (LR1) 320, it can be determined that the value "name", which is the image before the update, was changed to "kate", which is the image after the update. From a log record 2 (LR2) 330, it can be determined that the value "0000" was changed to "0021". When each of these log records 320 and 330 is generated, it is at the same time recorded in a log page.

If updates are continuously performed in this manner, the number of log records to be written in the log page increases in proportion to the frequency of updates.

FIG. 3B illustrates this. Referring to FIG. 3B, by following the log records 340 and 350 described above with reference to FIG. 3A, log records 360 and 370 for changes from "kate" to "john" and from "0021" to "0701" are generated, and it can be determined that log records 380 are subsequently continuously generated, due to other update operations.

In this way, the log size arising from the logging process may become several times to hundreds of times the size of the data actually updated. The increase in the log size causes disk inputs and/or outputs, thereby lowering the speed of update operations, and reducing the remaining space available on the disk. Also, when a recovery operation is performed due to the occurrence of an exceptional situation, the large size of the log data to be read from disk and processed increases the time required for recovery.

SUMMARY OF THE INVENTION

The present invention provides a logging method and apparatus for reducing a log size by using a log entry when a log record is generated by an update.

According to an aspect of the present invention, there is provided a method of logging in a database management system (DBMS), the method including: storing log information of a data page being updated; when the update of the data page is completed, reading the stored log information; generating a log record by using the read log information; and writing the generated log record in a log page.

The storing of the log information may include: generating a log entry including an offset value of the data page being updated; recording the log information of the data page being updated in the generated log entry; and merging at least one or more log entries by using the recorded log information.

In the merging of the at least one or more log entries, if a log entry already generated with respect to the same area as the area of the data page is updated exists, the log entry in which the log information of the data being updated, may be added to the already generated log entry, thereby merging the log entries.

In the merging of the at least one or more log entries, if a log entry already generated with respect to an area neighboring the area of the data page being updated exists, the offset value included in the already generated log entry may be changed in relation to the neighboring area, thereby merging the log entries.

In the merging of the at least one or more log entries, if a log entry already generated with respect to an area overlapping the area of the data page being updated exists, the offset value included in the already generated log entry may be changed in relation to the overlapping area, thereby merging the log entries.

The merging of the at least one or more log entries may be performed at a time when the update operation of the data page is completed.

The time when the update operation is completed may be a time when a transaction performing the update operation is committed, or when the data page is flushed.

The generated log entry may be managed in relation to the data page being updated, and in relation to each transaction performing the update operation.

The generated log entry may be sorted with respect to offset values included in the log entry.

The generating of the log entry, and the recording of the log information may use algorithms for recovery and isolation exploiting semantics (ARIES) and comply with a write ahead log (WAL) protocol.

According to another aspect of the present invention, there is provided a method of logging in a DBMS, the method including: generating a copied image of a data page being updated, the image being the same as an original image before an update; generating a log entry on the data page being updated; merging the generated log entries; performing an update operation of the original image; and if the update operation is completed, generating a log record, by using the original image, the copied image, and the merged log entry.

In the merging of the generated log entries, if a log entry already generated with respect to the same area as the area of the data page being updated exists, the log entry generated in relation to the data page being updated may be added to the already generated log entry, thereby merging the log entries.

In the merging of the generated log entries, if a log entry already generated with respect to an area neighboring the area of the data page is updated exists, an offset value included in the already generated log entry may be changed in relation to the neighboring area, thereby merging the log entries.

In the merging of the generated log entries, if a log entry already generated with respect to an area overlapping the area of the data page is updated exists, an offset value included in the already generated log entry may be changed in relation to the overlapping area, thereby merging the log entries.

The merging of the generated log entries may be performed at a time when the update operation of the data page is completed.

The time when the update operation is completed may be a time when a transaction performing the update operation is committed, or when the data page of the original image is flushed.

The method may further include registering the original image, the copied image, and information on the transaction performing the update operation in a buffer page information unit which is managing relationships between the original image, the copied image, and the transaction.

The generated log entry may be managed in relation to the data page being updated, and in relation to each transaction performing the update operation.

The generated log entry may be sorted with respect to offset values included in the log entry.

The log entry may have a data structure including an offset indicating the length of an area of the data page being updated or a start position of the updated area in the data page being updated, or an offset indicating a start position and an end position of an updated area in the data page being updated.

If a plurality of transactions performing the update operations exist and the update operations are performed at the same time, a strict 2-phase-locking (2PL) protocol may be applied.

If the transaction is committed when the update operation is completed, the method may further include: determining whether another transaction exists in the data page; if the determination result indicates that another transaction exists in the data page, recording the updated areas of the original image corresponding to respective log entries of the committed transaction, in the corresponding areas of the copied image; and if the determination result indicates that no other transaction exists in the data page, deleting the copied image.

If the transaction is aborted when the update operation is incompletely finished, the method may further include: determining whether another transaction exists in the data page; if the determination result indicates that another transaction exists in the data page, recording the areas of the copied image before the update, corresponding to respective log entries of the aborted transaction, in the corresponding areas of the original image; and if the determination result indicates that no other transaction exists in the data page, replacing the copied image with the original image.

If the transaction is committed when the update operation is completed, the method may further include: determining whether another transaction exists in the data page; if the determination result indicates that another transaction exists in the data page, recording that the transaction is committed, in the buffer page information unit; and if the determination result indicates that no other transaction exists in the data page, deleting the copied image.

If the transaction is aborted when the update operation is incompletely finished, the method may further include: determining whether another transaction exists in the data page, and by referring to the buffer page information unit, determining whether another transaction exists in the data page which is committed; if the determination result indicates that another transaction or another committed transaction exists in the data page, recording the areas of the copied image before the update corresponding to the respective log entries of the aborted transaction, in the corresponding areas of the original image; and if the determination result indicates that no other transaction or no other committed transaction exists in the data page, replacing the copied image with the original image.

If the data page of the original image is flushed when the update operation is completed, the method may further include: generating a log record of all the log entries of the flushed data page; and deleting the copied image.

According to another aspect of the present invention, there is provided an apparatus for logging in a DBMS, including: a log storage unit storing log information of a data page being updated; a log reading unit reading the log information stored in the log storage unit when the update operation of the data page is completed; and a log control unit generating a log record, by using the read log information, and recording the generated log record in a log page.

According to another aspect of the present invention, there is provided an apparatus for logging in a DBMS, including: a transaction control unit managing transactions performing update operations of a data page; a log control unit merging log information generated according to an update operation of a transaction managed by the transaction control unit, thereby generating a log record, and recording the generated log record in a log page; and a buffer control unit managing the data page for which the update operation is performed, and managing the log page so that the data page and the log page can be input to or output from a storage medium.

The log control unit may include: a first storage unit storing a copied image that is the same as the original image before the update of the data page for which the update operation is being performed; a second storage unit storing a log entry generated according to the update operation of the transaction managed by the transaction control unit; a log merging unit merging at least one or more log entries stored in the second storage unit; and a log output unit generating a log record by using the original image, the copied image, and the merged log entry when the update operation is completed, and recording the generated log record in a log page.

The buffer control unit may manage a buffer page information unit in which the original image, the copied image, and information on the transaction performing the update operation are registered.

According to another aspect of the present invention, there is provided a computer readable recording medium having embodied thereon a computer program for executing the methods.

BRIEF DESCRIPTION OF THE DRAWINGS

The above and other aspects of the present invention will become more apparent by describing in detail exemplary embodiments thereof with reference to the attached drawings in which:

FIGS. 3A and 3B illustrate log records generated when updates are performed according to conventional technology;

FIGS. 4A and 4B illustrate a result of merging a plurality of log records according to an exemplary embodiment of the present invention;

FIG. 13 illustrates pseudo-code for a process of generating a log entry according to an exemplary embodiment of the present invention;

FIG. 14 illustrates pseudo-code for a process of committing a transaction according to an exemplary embodiment of the present invention;

FIG. 15 illustrates pseudo-code for a process of aborting a transaction according to an exemplary embodiment of the present invention;

FIG. 16 illustrates pseudo-code for a process of flushing a data page according to an exemplary embodiment of the present invention;

FIGS. 19 through 21 are diagrams illustrating examples of updated data pages according to an exemplary embodiment of the present invention; and FIG. 22 is a comparison table illustrating log records reduced in each module of a DB according to an exemplary embodiment of the present invention.

DETAILED DESCRIPTION OF EXEMPLARY EMBODIMENTS

Figures 1, 2:
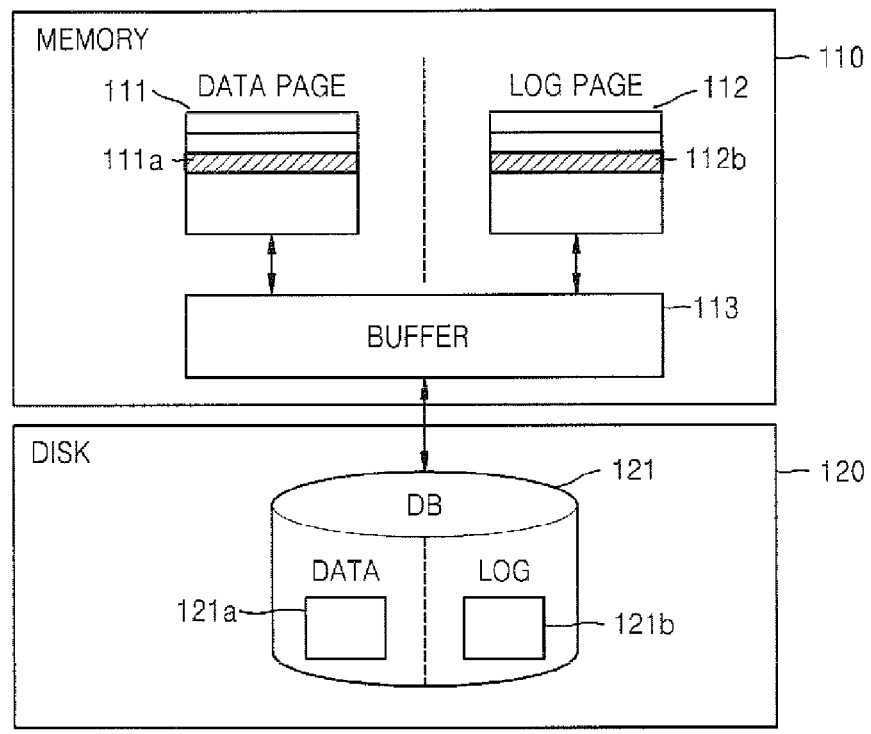
FIG. 1 is a schematic diagram illustrating a logging process of a DBMS according to conventional technology.
FIG. 2 is a diagram illustrating a data structure of a log record format according to conventional technology.
Figure 3A:
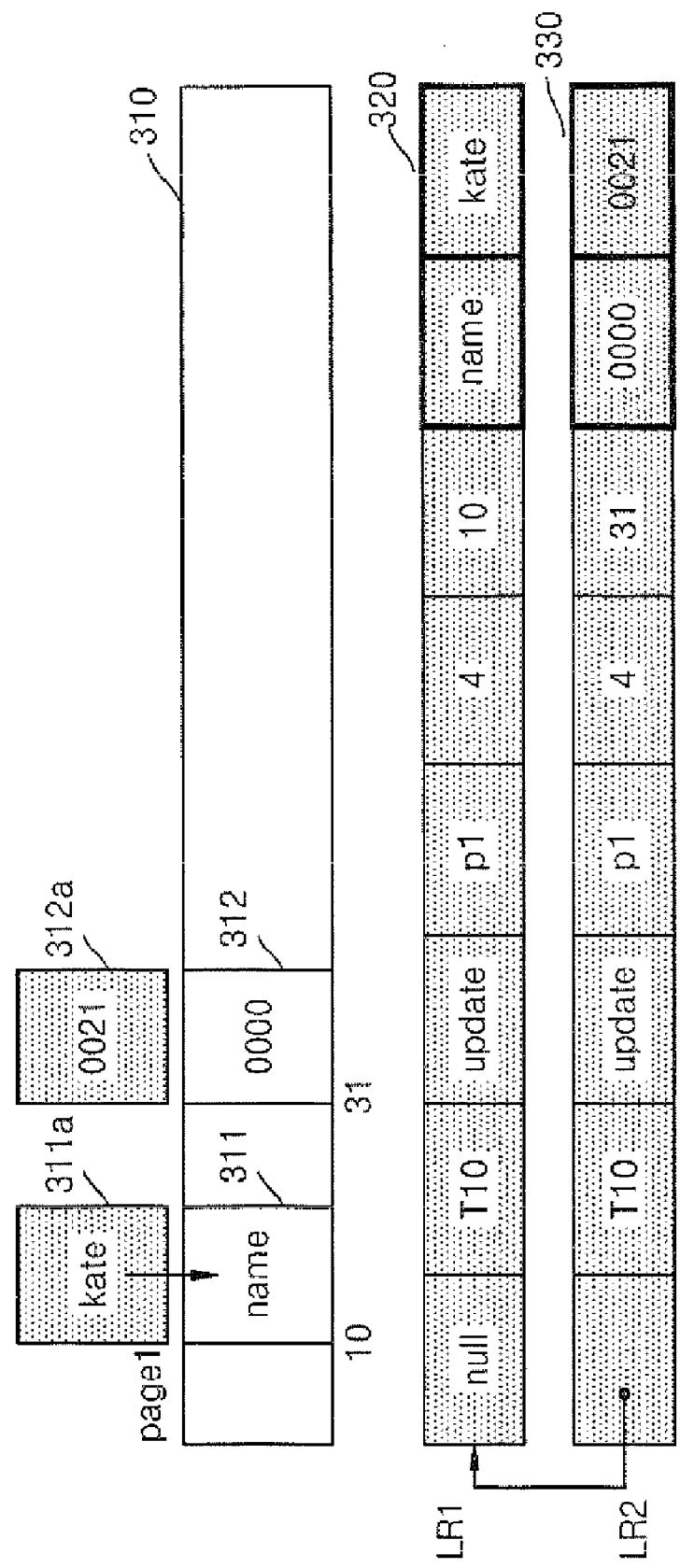

Exemplary embodiments of the present invention will now be described more fully with reference to the accompanying drawings.

FIGS. 4A and 4B illustrate a result of merging a plurality of log records according to an embodiment of the present invention.

Referring to FIG. 4A, three log records 410 through 430 can be seen to the left of an arrow. It can be determined that the three log records 410 through 430 are those generated by updating data having identical offset values with respect to an identical data page, that is, by updating data of the same area. These types of log records 410 through 430 frequently occur due to non-equalized update operations. Log records of a data area in which updates are frequently performed are generally of this type, e.g., log records for the frequency of visits of an identical user, or the number of times an identical music file is listened to. In this case, knowledge only of "0", which is the first image and "3", which is the last image, is sufficient to maintain the durability of the transaction with the one log record 440 to the right of the arrow.

Referring to FIG. 4B, the three log records 450 through 470 to the left of the arrow do not relate to updates of data of the same area. However, when the data lengths (4 bytes) of respective updated areas relative to offset values 20, 24, and 28, are compared with each other, it can be determined that the areas containing data ("0") to be updated are adjacent. Accordingly, one log record for updating the data "000", which corresponds to 12 bytes beginning from the offset value 20, with the value "111", can be derived, as in the log record 480 to the right of the arrow.

Figure 5:
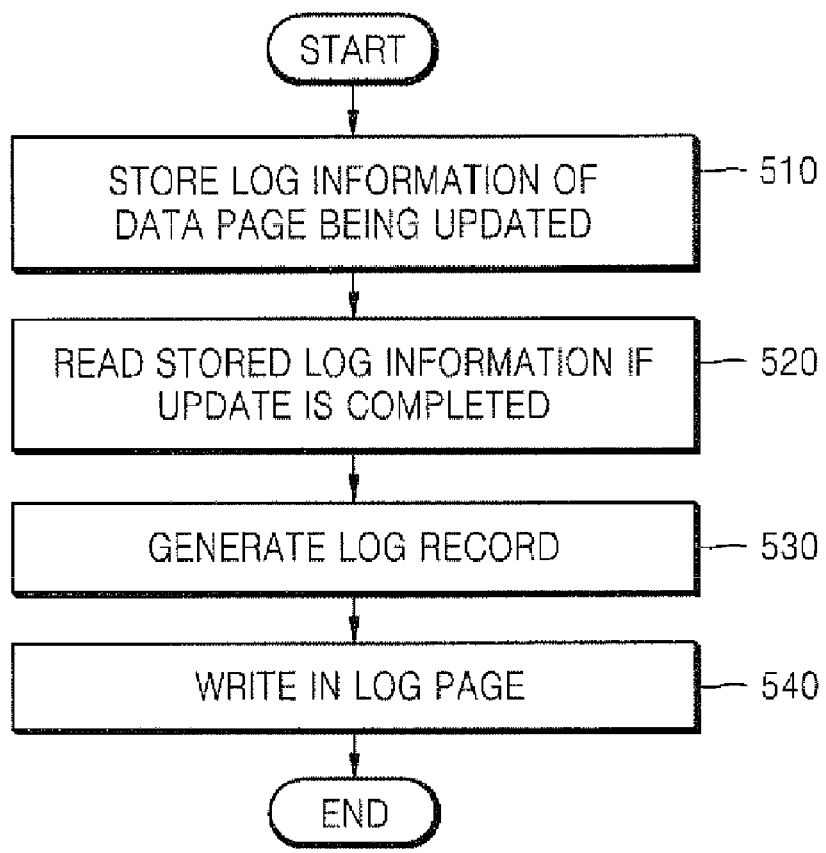
FIG. 5 is a flowchart illustrating a method of logging in a DB according to an exemplary embodiment of the present invention.

FIG. 5 is a flowchart illustrating a method of logging in a DB according to an embodiment of the present invention.

First, the log information of a data page being updated is stored in operation 510. That is, whenever an update is performed, instead of immediately generating a log record and writing the log record in a log page, the log information (a transaction ID, a type, a page ID, the length of updated data, an offset value, an image before update, and an image after update) of the data page being updated is temporarily stored. Then, if the update operation is completed, the stored log information is read in operation 520. That is, if the transaction performing the update operation is committed or the data page being updated is flushed, the stored log information is read. Using the read log information, a log record is generated in operation 530, and the generated log record is written in the log page in operation 540.

In the operations for generating and writing a log record, algorithms for recovery and isolation exploiting semantics (ARIES) are used and a WAL protocol may be used in compliance with the ARIES. Accordingly, a log record is generated with respect only to an updated image of a data page, and the log page is stored before the data page is stored.

Detailed operations will now be described regarding storing the log information for a data page being updated.

Figure 6:
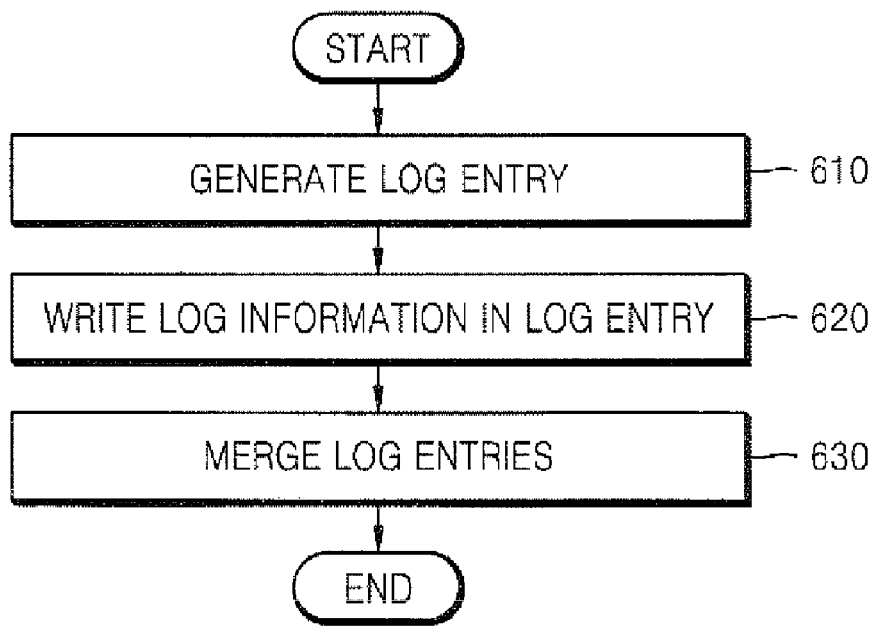
FIG. 6 is a more detailed flowchart illustrating storage of log information illustrated in FIG. 5 according to an exemplary embodiment of the present invention.

FIG. 6 is a flowchart illustrating operation 510 from FIG. 5 in further detail, according to an exemplary embodiment of the present invention.

Referring to FIG. 6, in the temporary storing of the log information, first, a log entry including an offset value of the data page is generated in operation 610, and the log information of the data page being updated is written in the generated log entry in operation 620. Then using the written log information, one or more log entries are merged together in operation 630.

The process of the merging can be broken down into three cases that can frequently occur in application programs.

First, log entries may be merged when an identical area is repeatedly updated. When an identical transaction repeatedly updates data of a predetermined area, a log record of an image before the update and an image after the update is generated and recorded each update time according to the conventional method. In the present exemplary embodiment, the log information required is an image from before a log record is generated by a first update, that is, a before-update image, and an image from after a log record is generated by a last update, that is, an after-update image. Information on image changes generated by updates in intermediate processes can be regarded as unnecessary information.

Accordingly, if a previously generated log entry with respect to an identical area of a data page exists for a data page being updated, the log entry containing log information for the data being updated can be added to the previously generated log entry for the identical area, thereby merging the log entries. An identical page can be found by using a page ID, a transaction ID, the length of data, and an offset value, and can also be found by using other parameter values indicating an area of a data page.

Secondly, log entries may be merged when neighboring areas are updated. When an identical transaction updates data of neighboring areas, that is, when the areas being updated are neighboring in terms of offset values, a log record is separately generated in each update according to conventional technology. In this case, if images after updates occur in the log records can be merged into one, only one log record may be generated.

Accordingly, if a previously generated log entry exists for an area neighboring an area of a data page being updated, the offset value included in the previously generated log entry is changed in relation to the neighboring area, thereby merging the log records. Determination of a neighboring area can be calculated by using a page ID, an offset value, and the length of the data. If only the start and end positions of a predetermined data area on a data page can be calculated, other methods of determination can also be used.

Thirdly, log entries may be merged when updates include an area which is updated one or more times. This corresponds to the case where updating of an identical area and updating of neighboring areas are mixed. When updates include an area which is updated at least once, a separate log record is generated in each update according to conventional technology. In the present exemplary embodiment, the images generated in intermediate update processes for an identical area are unneeded, and if images of different areas can be merged, multiple log records can be merged into one log record.

Accordingly, if there exists a previously generated log entry with respect to an identical area of a data page being updated, the offset values included in the previously generated log entry are changed in relation to the identical area, thereby merging the log records. Here, the identical area can be found using the same methods as those described above in the first and second cases.

Depending on an update operation, the merging process described above may be performed whenever a log entry is generated or upon completion of a data page update. A completion of a data page update generally refers to the point when an update transaction is committed, or when a data page is flushed. It may also refer to the point when updated contents of a transaction should be reflected in a database due to other events, or when a buffer page is input to or output from a disk according to a buffer replacement policy.

If the conventional logging method is used, it is difficult to reduce the size of a log file in the cases described above. This is because a predetermined pattern does not occur continuously when the above-described cases occur in an application program. In other words, in the conventional method, even when an operation updating an identical area occurs, this operation is not the only operation occurring; other operations may also occur while this operation is being performed. Accordingly, because certain log records on a log page are related to other operations performed while this operation is being performed, it is difficult to determine which log records relate to updates of an identical area, neighboring areas, or updated areas.

In the conventional method, even if these log records are identified, it is still difficult to merge log records once they are recorded in a log page. This is because merging requires changing the LSN of a log record, requiring another load to be processed. Also, the conventional method incurs overhead costs, such as the memory copying cost due to rewriting all of the previously recorded log records.

However, according to an exemplary embodiment of the present invention, in an operation for storing log information for a data page being updated, a log entry including an offset value of the data page is managed in each data page, and also in each transaction for updating operations. Here, a log entry is sorted based on its offset value, and forms a list. Accordingly, a log record in relation to updated data is not immediately generated and recorded in a log page at the time when the data is updated, and the problems associated with the LSN of the log record being immediately finalized and difficult to change do not occur.

Figure 7:
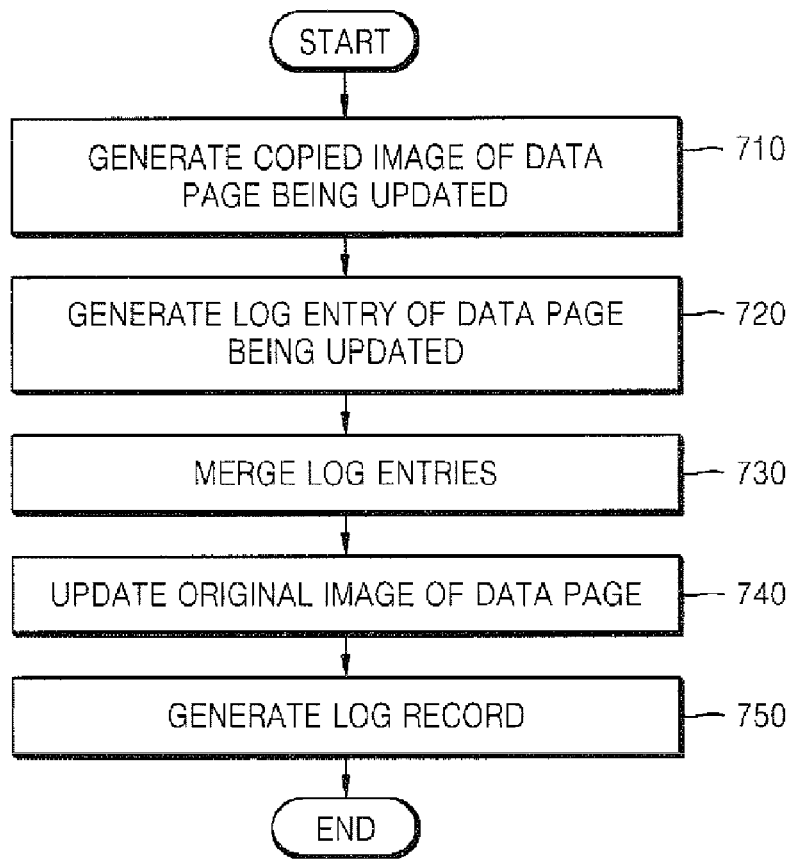
FIG. 7 is a flowchart illustrating a method of logging in a DB according to another exemplary embodiment of the present invention.

FIG. 7 is a flowchart illustrating a method of logging in a DB according to another exemplary embodiment of the present invention.

Referring to FIG. 7, if an update is performed, in operation 710, a copied image of a data page being updated is generated that is identical to an original image before the update. The image copy is temporarily stored in memory until a log record is generated. Then, a log entry with respect to the data page being updated is generated in operation 720. The generated log entries are merged with each other in operation 730. A pattern for the merging can be performed as described above. Changed contents corresponding to the update are reflected in the original image in operation 740, and if the update is completed, a log record is generated by using the merged log entry in operation 750. In this case, data for the before-image of the log record is fetched from the image copy, and data for the after-image is fetched from the original image.

Depending on the update operation, the merging process may be performed whenever a log entry is generated, or may be performed generally when an update is completed, such as when an update transaction is committed, or when a data page is flushed.

Also, an operation for registering an image copy and information on an update transaction in a buffer page information unit may be further included. The buffer page information is for managing relationships between original images, image copies, and update transactions, and stores information on the page ID of a data page being updated, a position pointer of an image copy, the ID of an update transaction, and whether or not a transaction is committed. The log entry generated by an update is managed in the memory together with updated pages by the buffer page information unit. When the updated page is flushed to the disk by a buffer replacement policy or the transaction is committed, a log record is generated and written in a log page.

According to this logging method, log information generated between the start and end of the transaction is included in a log record which is generated when the transaction is committed, and recorded in a log page, thereby guaranteeing that the log information is flushed to the disk. Accordingly, recovery of the log information is also guaranteed.

Figure 8A:
FIGS. 8A and 8B are diagrams illustrating data structures of a log entry format according to an exemplary embodiment of the present invention.
Figure 8B:
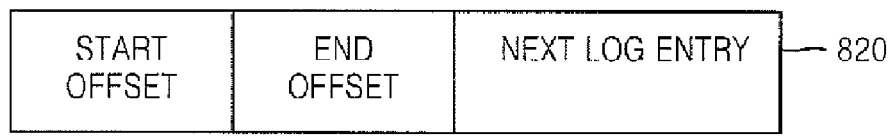

FIGS. 8A and 8B are diagrams illustrating data structures of log entry formats according to an embodiment of the present invention.

As described above, instead of generating a log record immediately after an update is performed, a log entry is generated and temporarily stored in memory. The log entry may have the following fields:

length: the length of an updated data area;

offset: an offset value of a start position of the updated area in a page;

next log entry (next): a pointer indicating a next log entry;

start offset (soffset): an offset value indicating the start position of the updated area in the page;

end offset (eoffset): an offset value indicating the end position of the updated area in the page.

According to the implementation, either of the formats shown in FIGS. 8A and 8B, as well as others not specifically shown here, can be selected and used.

Here, it should be noted that information managed by a log entry managed based on the concept of a "position". That is, the log entry stores all changes due to an update to a data page according to their positions. This is essential information in the process of merging log entries and because of this, the number of log records written in a log page can be greatly reduced.

Figure 9:
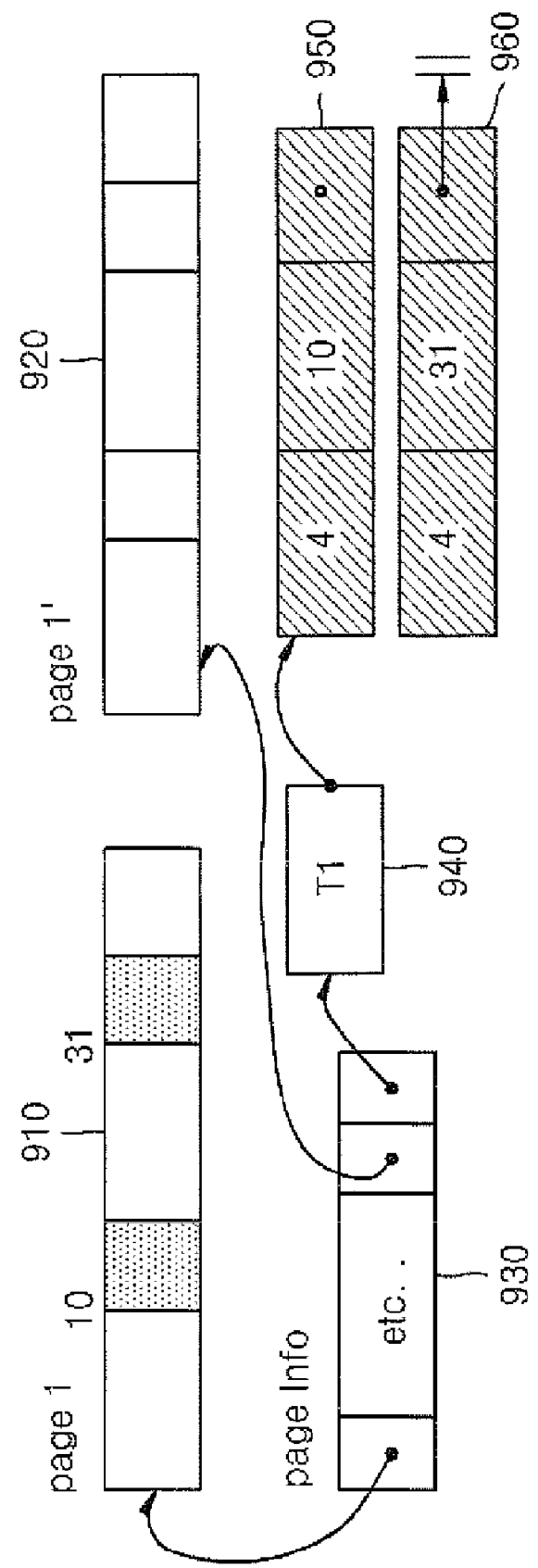
FIG. 9 is a diagram illustrating an example of an update by one transaction according to an exemplary embodiment of the present invention.

FIG. 9 is a diagram illustrating an update by one transaction according to an exemplary embodiment of the present invention.

Referring to FIG. 9, page 1 910 is an original image, and page 1' 920 is a copy of the original image. In addition, a buffer page information unit (page info) 930, one transaction T1 940, and two log entries 950 and 960 are illustrated. If an update is performed, an image copy, page 1' 910, of the updated page is generated.

In order to identify which transaction performs the update, the buffer page information unit (page info) 930 manages the ID of the transaction T1 940. The transaction T1 940 generates a list of log entries 950 and 960 with the information on the updates of the page 1 910. The list of log entries 950 and 960 is sorted relative to offset values and maintained in the memory. That is, the operations illustrated in FIG. 9 can be briefly described as follows.

i) The transaction T1 940 updates a 4-byte area beginning from offset 10 of the page 1 910. This is the first update occurring in the page 1 910. Accordingly, before the page 1 910 is updated, a copy of the page, page 1' 920, is generated. The ID of the transaction T1 940 is registered in the buffer page information unit 930, and the log entry 950 is generated with the updated information in order to indicate that the information is updated by the transaction T1 940. The original image page 1 910 is then updated with a desired updating image.

ii) The transaction T1 940 updates a 4-byte area beginning from offset 31 of the page 1 910. At this time, the log entry 960 is generated, sorted with respect to offset values, and inserted into the log entry list. Then, the page 1 910 is updated with a desired updating image. The generated log entries 950 and 960 are only maintained in memory, and not written as log records in the log page.

iii) The page 1 910 is selected as an object page (target) by a buffer replacement policy, and flushed to the disk (or the transaction T1 940 is committed). A log record is made of the log entries 950 and 960 existing in relation to the corresponding page (in this case, the page 1 910), or the log entries 950 and 960 generated by the committed transaction (in this case, the transaction T1 940), and written in the log page.

Figure 10:
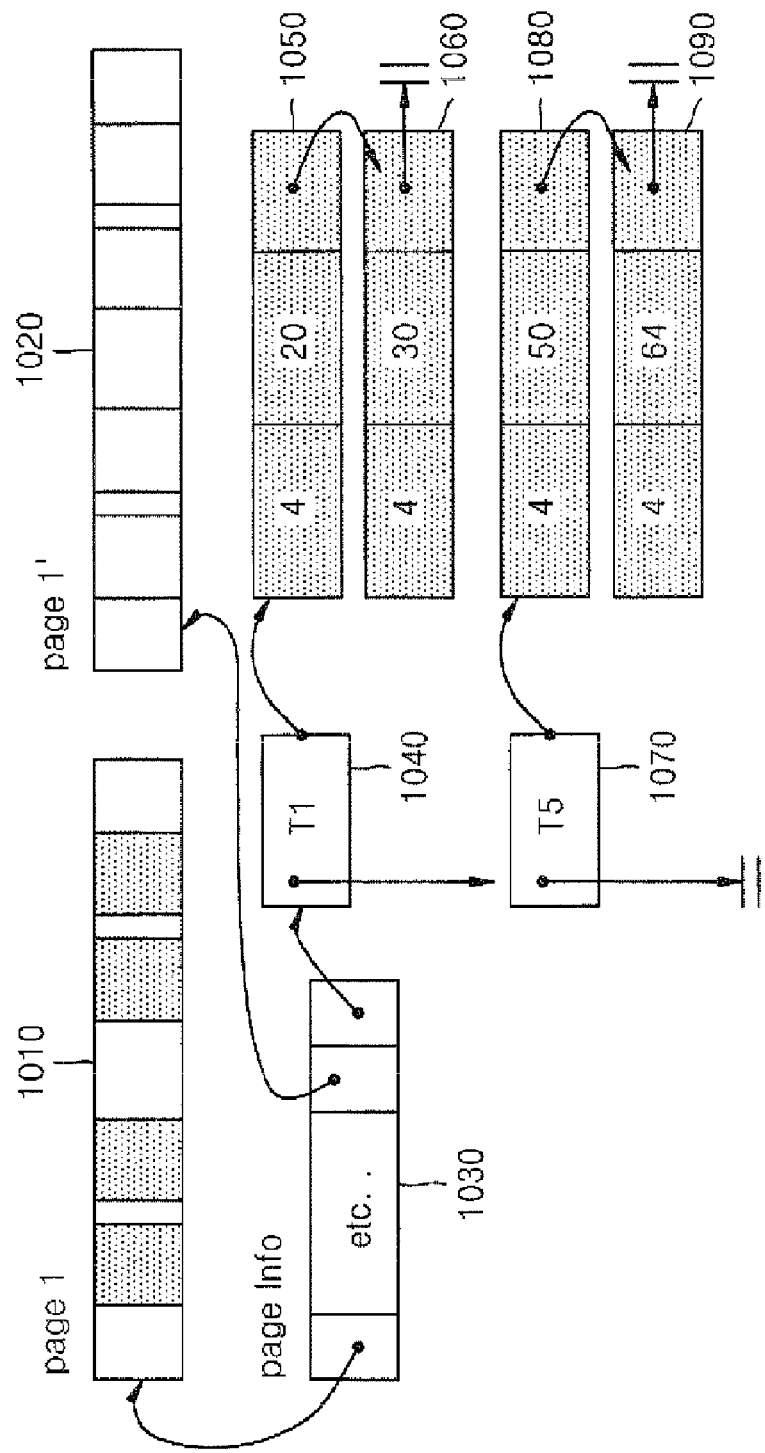
FIG. 10 is a diagram illustrating an example of an update by two or more transactions according to an exemplary embodiment of the present invention.

FIG. 10 is a diagram illustrating an update by two or more transactions according to an exemplary embodiment of the present invention.

Referring to FIG. 10, two transactions T1 1040 and T2 1070 update different areas of a page 1 1010, respectively, and log entries 1050, 1060, 1080, and 1090 are generated from the update information, connected to corresponding transactions T1 and T5, and managed. The difference between FIG. 10 and FIG. 9 is that a list of log entries is managed in relation to each of a plurality of transactions in FIG. 10.

In this case, when two or more transactions operate at the same time, a strict 2-phase-locking (2PL) protocol is complied with. Accordingly, since the strict 2PL protocol is complied with, a situation in which two or more activated transactions update an identical area does not occur.

A locking protocol is a set of rules by which a DBMS permits only a serial and recoverable schedule. The locking protocol includes shared locking and exclusive locking, and the strict 2PL locking is performed according to the following rules. The first rule is that if a transaction T wants to read or write an object, the transaction T first requests shared or exclusive locking of the object, respectively. The second rule is that all locking states owned by a transaction are unlocked when the transaction is completed. According to the rules for requesting and obtaining locking, when an object is locked by shared-locking of a first transaction, and a second transaction requests shared locking of the same object, the second transaction can obtain the shared-locking, but if a first transaction requests exclusive locking, the second transaction must wait. Also, when an object is locked by exclusive-locking of a transaction, other transactions requesting any type of locking must wait. However, other transactions can directly read an object for which exclusive locking has been obtained.

Figure 11:
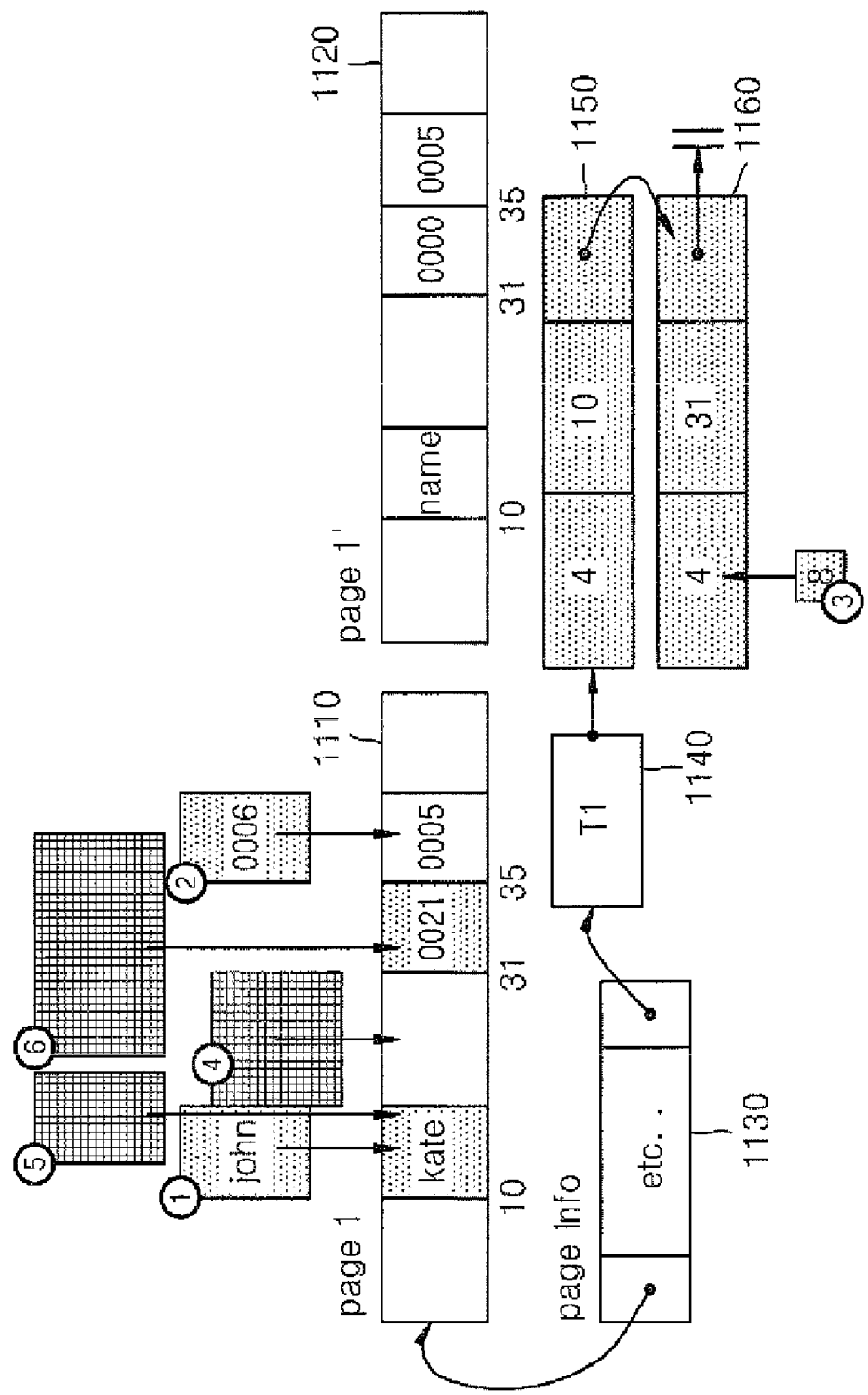
FIG. 11 is a diagram illustrating operations for each pattern of an update according to an exemplary embodiment of the present invention.
Figure 12:
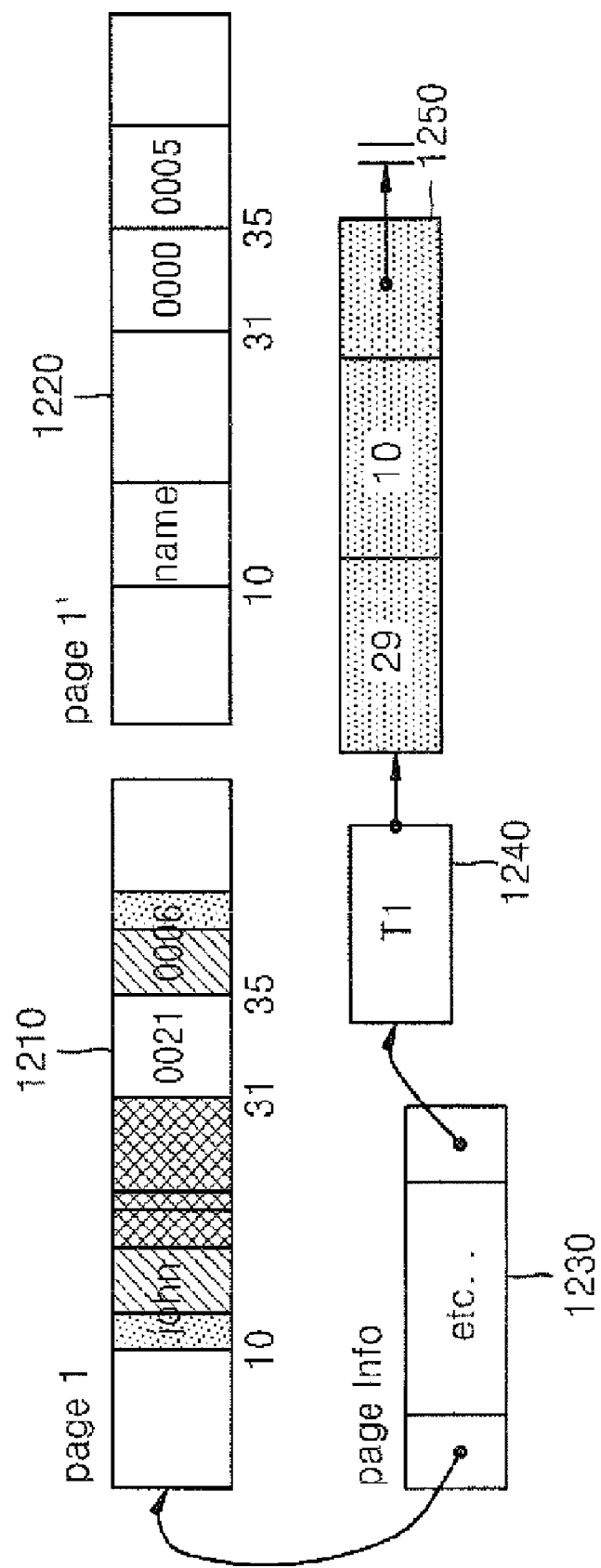
FIG. 12 is a diagram illustrating a log entry generated as a result of the completion of the operations illustrated in FIG. 11 according to an exemplary embodiment of the present invention.

FIG. 11 is a diagram illustrating operations for each pattern of an update according to an exemplary embodiment of the present invention. FIG. 12 is a diagram illustrating a log entry generated as a result of completion of the operations illustrated in FIG. 11, according to an exemplary embodiment of the present invention.

The case illustrated in FIG. 11 will now be briefly explained. A transaction T1 1140 updates "name" with "kate" in a 4-byte area beginning from offset 10 of a page 1 1110, and updates "0000" with "0021" in a 4-byte area beginning from offset 31 of the page 1 1110. A copy of page 1 1110, page 1' 1120, and two log entries 1150 and 1160 are generated.

The process of updating operations illustrated in FIG. 11 will now be explained in the order of the circled numbers (①) through ⑥).

① Update of "kate" with "john". This is the case where an identical area is updated, and the log entry 1150 corresponding to a previous update has already been generated for the change of "name" to "kate". At this time, the only required operation is updating the page 1 1110, which is the original page, with "john", which is the image after update. Therefore, a new log entry is merged into the previously generated log entry 1150, and a new log entry does not need to be added.

② Update of "0005" with "0006". In this case, the 4 bytes from offset 35 are updated, and the area is adjacent to an existing updated area. In this case, it can be identified that the end position of the updated image of the second log entry 1160, for the change from "0000" to "0021", is adjacent to the image currently being updated, and the length field of the log entry 1160 can be changed so as to include the length of the neighboring area (③).

④ Update of an area from offset 14 to offset 31. This is the case in which an area positioned between and neighboring two existing updated areas is updated. In this case, the second log entry 1160 of the two existing log entries is deleted, "4" in the length field of the first log entry 1150 is updated with "29", and the updated image is recorded in the page 1 1110.

⑤, ⑥ Update of an area including an already updated area. The update is performed in a manner similar to that of ④.

If the operations ① through ⑥ are performed, only one log entry 1250 as illustrated in FIG. 12 is ultimately generated. Accordingly, when the original image, i.e. the copied image, is referred to, it can be determined that log entries are merged into one log entry although updates are performed 8 times in total. Accordingly, when a transaction is committed or a page is flushed, only one log record is generated and written.

FIG. 13 illustrates pseudo-code indicating a process of generating a log entry according to an exemplary embodiment of the present invention. The operations may be performed in a different order unless changing the order of operations changes the final result.

In a process of generating a log entry, if the log entry is the first log entry in a page, a copied image of the page should be generated. Then, the log entry is generated, sorted with respect to offset values, and added to a list. By referring to the offset value, log entries are merged with each other according to a merging pattern. Finally, the original image of the page is updated to be an after-image, i.e., an image after the update.

FIG. 14 illustrates pseudo-code indicating a process of committing a transaction according to an exemplary embodiment of the present invention.

In a process of logging when a transaction (txn) is committed, if a page exists including a log entry updated by the committed transaction, the following operations are performed for each such page. First, the log entry of the transaction is read, and a log record is generated. This log record essentially requires an image before the update, or before-image, and an image after the update, or after-image. If a log entry of another transaction exists in the page, an after-image in an area updated by the committed transaction is recorded in the copied image, so that this area cannot be aborted during an update by the other transaction. This allows compliance with the concept of durability of a DBMS, namely that a result updated by a committed transaction should be reflected in the DB. Accordingly, an aborting of another future transaction does not affect the data of the updated area of the currently committed transaction, because it is recorded in the copied image of the page, and is thereby kept safe.

Also, the fact that the transaction has been committed may be recorded in a buffer page information unit, thereby preparing for the potential aborting of another transaction. In this case, a procedure should be added to an abort operation for determining whether or not a committed transaction already exists in a page.

Thus, a preventive operation is performed in the case of an abort operation by another transaction; subsequently, a generated log record is written in a log page, and the read log entry is deleted.

Next, if the log entry of another transaction does not exist any more in the page, that is, if the currently committed transaction is the only transaction, the copied image of the page is not required and thus is deleted.

FIG. 15 illustrates pseudo-code indicating a process of aborting a transaction according to an exemplary embodiment of the present invention.

Incompletion of a transaction indicates an exceptional situation, such as when a transaction is aborted by an internal cause of a DBMS and the transaction is automatically restarted, or when a system error occurs while a transaction is being performed, or a predetermined command of a transaction reads an incorrect value, or a disk cannot be accessed.

In an abort process, if a log entry of another transaction does not exist in the page, that is, if the transaction being aborted is the only transaction in the page, the original image is replaced by the copied image of the page, and the original image can be deleted. However, if another transaction of the page has a log entry, the transaction being aborted should read its own log entries and only the image area from before the update, corresponding to each log entry, should be recovered.

As described above, if information indicating whether or not another committed transaction exists is recorded in the buffer page information unit, this information can be utilized. That is, if it can be determined from the buffer page information unit that another committed transaction exists in the page, the transaction being aborted can read its own log entries, and the before-images for specific image areas corresponding to each log entry can be recovered.

FIG. 16 illustrates pseudo-code indicating a process of flushing a data page according to an exemplary embodiment of the present invention.

When a page is flushed to a disk by a buffer replacement policy, a log record of all log entries of the page is generated and recorded in a log page. It is also necessary to delete the copied image of the page.

Figure 17:
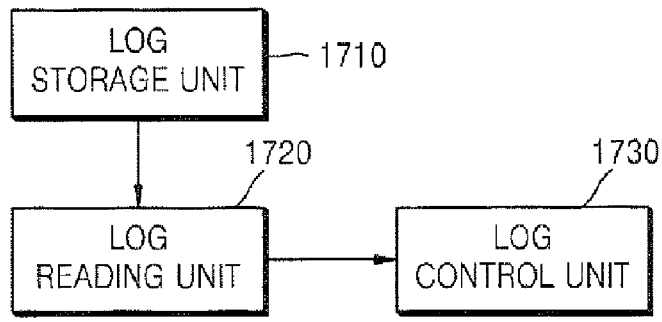
FIG. 17 is a schematic functional block diagram illustrating a database logging apparatus according to an exemplary embodiment of the present invention.

FIG. 17 is a schematic functional block diagram illustrating a database logging apparatus according to an exemplary embodiment of the present invention.

The apparatus of FIG. 17 is broadly composed of a log storage unit 1710, a log reading unit 1720, and a log control unit 1730. The log storage unit 1710 stores log information of a data page being updated, and the stored log information is transferred to the log reading unit 1720 only when the update of the data page is completed. The read log information is used by the log control unit 1730 to make a log record, and is recorded in a log page.

Figure 18:
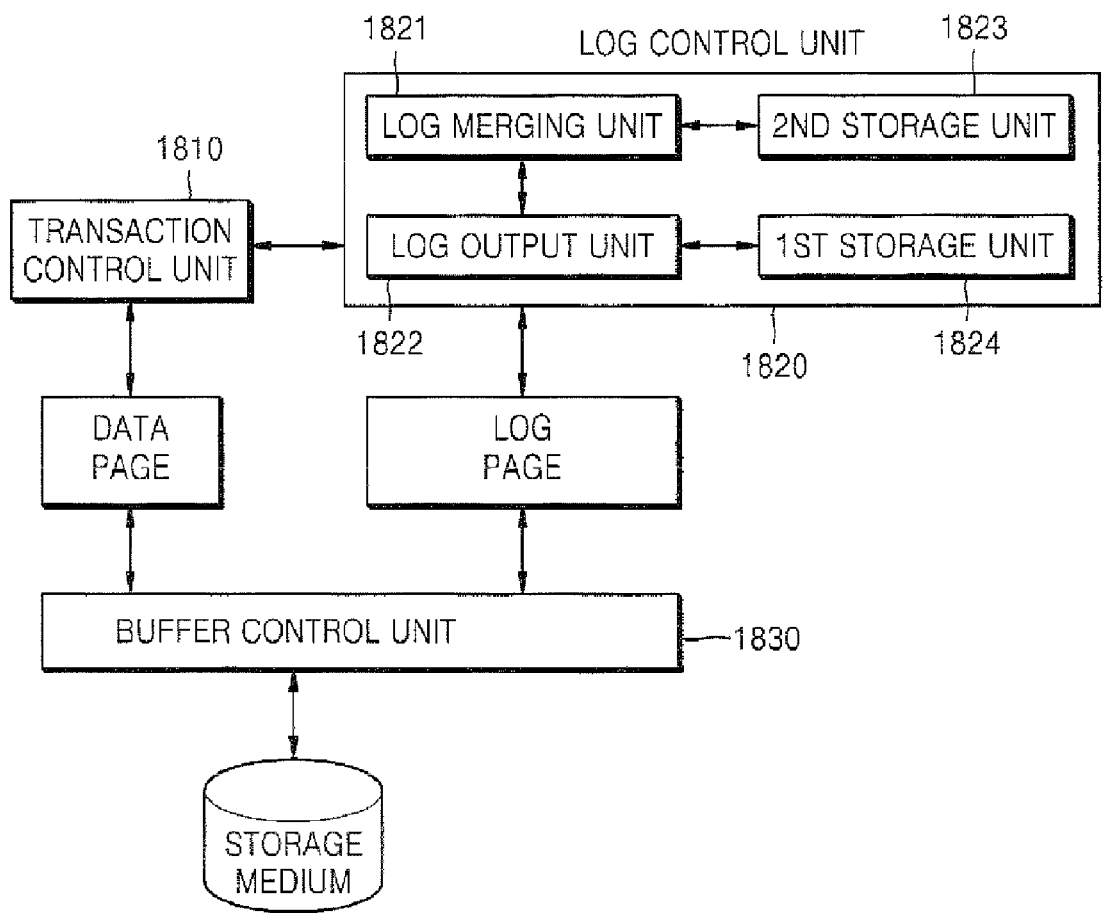
FIG. 18 is a functional block diagram illustrating a database logging apparatus according to an exemplary embodiment of the present invention.

FIG. 18 is a functional block diagram illustrating a database logging apparatus according to an exemplary embodiment of the present invention.

In relation to the function of each module, a transaction control unit 1810 manages transactions performing updates of a data page by using an application program.

A buffer control unit 1830 manages disk input and/or output operations of a storage medium, storing in the storage medium an updated data page and a log page, in which a log record is written, or reading a new page from the storage medium. That is, the buffer control unit 1830 is responsible for a flush operation according to a buffer replacement policy. The buffer control unit 1830 also manages a buffer page information unit in which an original image, a copied image, and information on an update transaction are registered. In the buffer page information unit, the page ID of a data page being updated, the position pointer of a copied image, the ID of an update transaction, and information on whether or not a transaction is committed, can be registered.

A log control unit 1820 merges log information generated according to an update performed by the transaction control unit 1810, thereby generating a log record, and writes the log record in a log page. The log control unit 1820 may further include a first storage unit 1824, a second storage unit 1823, a log merging unit 1821, and a log output unit 1822.

The first storage unit 1824 stores the copied image of a data page in which an update is performed, and the copied image includes the same data as that of the original image before the update is reflected therein.

The second storage unit 1823 stores log entries, in the form of a list, which are generated by an update of a transaction managed by the transaction control unit 1810. As described above, a log entry is managed in relation to each data page being updated and in relation to each transaction, and is sorted with respect to offset values.

The log merging unit 1821 merges the log entries stored in the second storage unit 1823, by using the thus sorted and managed log entries, and reduces the total number of log entries. The merging is performed according to the update patterns described above.

If the update is completed, the log output unit 1822 generates a log record and writes the log record in the log page. This is because the updated data area should be reflected in the DB and consistency and durability should be maintained. In this case, by using the copied image stored in the first storage unit 1824 and the merged log entry stored in the second storage unit 1823, the log output unit 1822 generates the log record and writes the log record in the log page. The log record includes the before-image, the after-image, and other required information according to a data format complying with the ARIES algorithm, described above. The before-image is the copied image stored in the first storage unit 1824, and the after-image is the image of the current data page. The offset information of the updated area can be determined from the log entry stored in the second storage unit 1823.

FIGS. 19 through 21 are diagrams illustrating examples of updated data pages according to an exemplary embodiment of the present invention.

Referring to FIG. 19, the numbers 1 through 12 indicate the sequence of updates and corresponding data areas. According to conventional methods, the number of log records generated by the update operations as illustrated in FIG. 19 is proportional to the number of updates. Therefore, if conventional methods were applied to the example in FIG. 19, 12 log records would be generated, each log record would be assigned an LSN, and each LSN would be recorded in a log page. However, according to an exemplary embodiment of the present invention, in this case, updated areas (1,5), (6,2, 7,8,11), (4,9), and (10,12) are neighboring areas, and thus only five log records for (1,5), (3), (6,2,7,8,11), (4,9), and (10,12) are generated. Also, even though another update is performed in a previously updated area, no additional log record is generated.

Referring to FIG. 20, in an example of a DB using a heap file and b-tree method, the pattern of updates occurs in the order of 1, 2, 3, 4, etc., moving toward the center from both ends, as illustrated in FIG. 20. In the update operations of this pattern, if a logging method according to an exemplary embodiment of the present invention is applied, only two log records are generated. If the update operations are performed continuously and the updates meet at the center, updating the entire area illustrated in FIG. 20, only one log record will be generated.

Referring to FIG. 21, an update pattern of a catalogue manager (CatalogMgr) is illustrated according to an exemplary embodiment of the present invention. The catalogue manager (CatalogMgr) includes information on a record count and an index key count. According to the update pattern illustrated in FIG. 21, it can be determined that only two log records for updated areas (1,2,3) and (4,5) are generated.

FIG. 22 is a comparison table illustrating log records reduced in each module of a DB according to an exemplary embodiment of the present invention.

Referring to FIG. 22, when 7000 records are included in one table in a DB, and 5000 records from them are deleted, the numbers of log records currently occurring and the numbers of log records occurring after merging in respective cases are compared.

The total of the DB modules indicates the total number obtained by adding log records of free page map (FPMap), CatalogMgr, and DataPage. The individual log records are log records in which updated areas are different from each other. The log records after merging are log records that are generated when all neighboring areas are merged. The FPMap module is a module for managing information on the use and/or non-use of the entire DB. The CatalogMgr is the catalogue manager described above, and a module including information on a record count and an index key count. The DataPage is a data page in which actual data is recorded.

When the log sizes are compared, the total log size of 1315 KB is reduced to 195 KB, which is a 1120 KB decrease, when only log records of identical areas are considered. Also, when neighboring areas are considered, it can be determined that the total size is reduced to 23 KB, just 1.7% of the size according to conventional technology.

According to the logging method of a DB of the exemplary embodiments of the present invention as described above, the log size due to logging is reduced, and the times of disk input and/or output operations decrease, thereby improving the update speed of a database system.

Also, when a transaction is committed or a page is flushed, multiple log entries of a page are recorded as a log records at one time. Accordingly, the probability that updated areas corresponding to log records recorded in a log page are in an identical page increases, thereby increasing the locality of a page to be recovered when a recovery operation is performed.

Meanwhile, when a transaction is aborted, a log entry is deleted from memory, and a copied page is substituted for an original page, thereby performing the abort operation in a simple manner and thus reducing the cost of the abort operation.

When a recovery operation is performed, the size of a log file to be read from a storage medium decreases because of the reduced log size. Also, because of the increased locality, the cost of disk input and output operations to be performed with a storage medium for a recovery operation decreases.

Accordingly, in a situation where a memory should be sufficient, but due to log records, a bottleneck in the disk input and output operations occurs, the deferred logging method greatly reduces the size of a log file stored in a storage medium, and thereby maximizes benefits.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method of logging performed in a logging apparatus in a database management system (DBMS), the method comprising:
    generating a copied image of a data page being updated, the copied image being identical to an original image of the data page before being updated, wherein the copied image is temporarily stored in a first memory of the logging apparatus until a log record is generated;
    generating a log entry on the data page being updated, wherein the log entry is maintained in a second memory of the logging apparatus and not written in a log page;
    merging the generated log entry and another log entry to generate a merged log entry; performing an update operation with respect to the original image of the data page; and
    when the update operation is completed, generating the log record based on the original image, the copied image, and the merged log entry, and recording the log record in the log page,
    wherein the merging comprises:
    determining whether there exist one or more previously generated log entries with respect to the same area as an area of the data page being updated and uniting the log entry to the one or more previously generated log entries;
    determining whether there exist one or more previously generated log entries with respect to an area neighboring an area of the data page being updated and changing an offset value included in the one or more previously generated log entries in relation to the neighboring area; and
    determining whether there exists a previously generated log entry with respect to an area overlapping an area of the data page being updated and changing an offset value included in the previously generated log entry in relation to the overlapping area.

2. The method of claim 1, wherein the merging is performed at a time when the update operation of the data page is completed.

3. The method of claim 2, wherein the time when the update operation of the data page is completed, is when a transaction performing the update operation is committed, or when the data page of the original image is flushed.

4. The method of claim 1, further comprising:
    registering information regarding the original image, the copied image, and the transaction performing the update operation, in a buffer page information unit which manages relationships between the original image, the copied image, and the transaction.

5. The method of claim 4, wherein the log entry is managed in relation to the data page being updated, and in relation to each transaction performing the update operation.

6. The method of claim 5, wherein the log entry is sorted with respect to the offset value included in the log entry.

7. The method of claim 6, wherein the log entry comprises:
    a length of an area of the data page being updated and a start position of the updated area in the data page being updated, or
    a start position and an end position of an updated area in the data page being updated.

8. The method of claim 4, wherein if a plurality of transactions performing the update operations exist, and the update operations are performed at the same time, a strict 2-phase-locking (2PL) protocol is applied.

9. The method of claim 8, wherein if the transaction is committed when the update operation is completed, the method further comprises:
    determining whether another transaction exists in the data page;
    if the determining indicates that another transaction exists in the data page, recording the updated areas of the original image, corresponding to respective log entries of the committed transaction, in the corresponding areas of the copied image; and
    if the determining indicates that no other transaction exists in the data page, deleting the copied image.

10. The method of claim 8, wherein if the transaction is aborted before the update operation is completed, the method further comprises:
    determining whether another transaction exists in the data page;
    if the determining indicates that another transaction exists in the data page, recording the areas of the copied image corresponding to respective log entries of the aborted transaction, in the corresponding areas of the original image; and
    if the determining indicates that no other transaction exists in the data page, replacing the copied image with the original image.

11. The method of claim 8, wherein if the transaction is committed when the update operation is completed, the method further comprises:
    determining whether another transaction exists in the data page;
    if the determining indicates that another transaction exists in the data page, recording in the buffer page information unit that the transaction is committed; and
    if the determining indicates that no other transaction exists in the data page, deleting the copied image.

12. The method of claim 8, wherein if the transaction is aborted before the update operation is completed, the method further comprises:

determining whether another transaction exists in the data page;

determining whether another committed transaction exists in the data page, by referring to the buffer page information unit;

if the determinings indicate that another transaction or another committed transaction exists in the data page, recording the areas of the copied image corresponding to the respective log entries of the aborted transaction, in the corresponding areas of the original image; and if the determinings indicate that no other transaction and no other committed transaction exist in the data page, replacing the copied image with the original image.

13. The method of claim 8, wherein if the data page of the original image is flushed when the update operation is completed, the method further comprises:

generating a log record of all log entries of the flushed data page; and deleting the copied image.

14. An apparatus for logging in a database management system (DBMS), comprising:

a transaction control unit which manages transactions performing update operations of a data page;

a log control unit which merges log information generated according to an update operation of a transaction managed by the transaction control unit, thereby generating a log record, and records the generated log record in a log page;

a buffer control unit which manages the data page for which the update operation is performed, and manages the log page so that the data page and the log page can be input to or output from a storage medium, wherein the log control unit comprises:

a first storage unit in which a copied image is stored, wherein the copied image is the same as an original image before the update of the data page for which the update operation is being performed;

a second storage unit in which a log entry is stored, wherein the log entry is generated according to the update operation of the transaction manager by the transaction control unit;

a log merging unit which merges, the log entry with another log entry stored in the second storage unit; and a log output unit which generates a log record based on the original image, the copied image, and the merged log entry, when the update operation is completed, and records the generated tog record in a log page, wherein the log merging unit:

determines whether there exist one or more previously generated log entries with respect to the same area as an area of the data page being updated and unites the log entry to the one or more previously generated log entries;

determines whether there exist one or more previously generated log entries with respect to an area neighboring an area of the data page being updated and changes an offset value included in the one or more previously generated log entries in relation to the neighboring area; and determines whether there exists a previously generated log entry with respect to an area overlapping an area of the data page being updated and changes an offset value included in the previously generated log entry in relation to the overlapping area.

15. The apparatus of claim 14, wherein the buffer control unit manages a buffer page information unit in which the original image, the copied image, and information on the transaction performing the update operation, are registered.

* * * * *